W. COOPER.
Flat-Iron Heater.
No. 162,034.
Patented April 13, 1875.
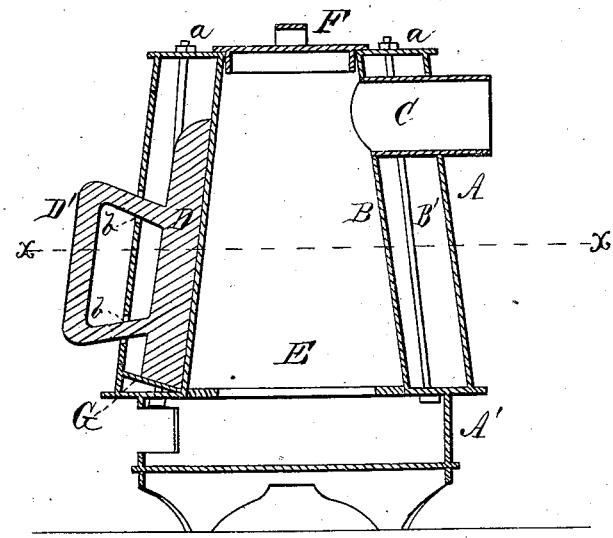
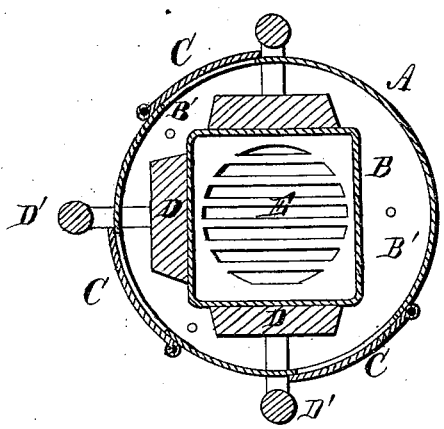 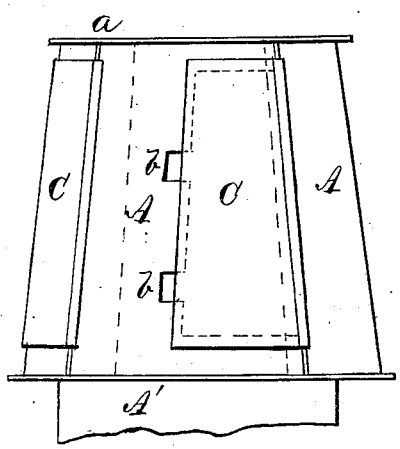
WITNESSES
INVENTOR

UNITED STATES PATENT OFFICE.

WILLIAM COOPER, OF YPSILANTI, MICHIGAN.

IMPROVEMENT IN FLAT-IRON HEATERS.

Specification forming part of Letters Patent No. 162,034, dated April 13, 1875; application filed February 18, 1875.

*To all whom it may concern:*

Be it known that I, WILLIAM COOPER, of Ypsilanti, in the county of Washtenaw and in the State of Michigan, have invented certain new and useful Improvements in Sad-Iron Heaters; and do hereby declare that the following is a full, clear, and exact description thereof, reference being had to the accompanying drawings, and to the letters of reference marked thereon, making a part of this specification.

My invention consists in the construction of a peculiar portable sad-iron heater, as hereinafter more fully set forth.

To enable others skilled in the art to construct and use my invention, I will proceed to describe the same, referring to the accompanying drawings, making a part of this specification, in which—

Figure 1 represents a vertical section; Fig. 2, a horizontal section; and Fig. 3, a side elevation.

A represents the body or case, made of suitable metal, and rested upon a base, A', which forms an ash-pit, and rested upon suitable feet or supports. The body A is largest at its lower part, and slightly tapers to the top. E represents a grate, which extends across the bottom of an interior polygonal shell, B. This shell tapers to correspond with the casing A, and extends from the grate to the top of the casing, leaving a hot-air space, B', between the two. The top of the shell B is covered by a removable cap, F. By removing the cap an opening is left, through which fuel is fed to the grate. The ash-pit A' has a door for allowing the ashes to be taken out, and to afford a draft for the fire in the fire-chamber. C represents the exit-pipe for the smoke. Between the outer case A and the inner shell B, opposite to each of the flat sides of the shell, and at the bottom of both, is placed an incline, G, so that the irons D, when placed in the chamber B', will rest on these inclines, and be caused to lie flat against the heating-surfaces of the shell. In the case A, opposite to each of the flat parts of the shell, is a hinged door, C', and upon the body A, adjacent to the free part of each door, are cut two notches, b b, for the passage of the handles D' of the sad-irons.

The top of my heater is made flat, as shown at a, so that any article may rest thereon and be heated or kept partially warm.

It will be seen in the accompanying drawings that the shell B is made four-sided, and that the smoke-pipe extends from one side. Hence a door, C', is provided for the other three sides to accommodate the heating of three irons.

I do not wish to confine my invention to any limited number of irons, as the shell may have more or less flat sides, and a door be made for each, as well as inclines to correspond therewith.

By my construction of sad-iron heaters the entire iron is inclosed, excepting the handles thereof. These handles are extended through the notches outside of the case, to prevent the same from becoming too hot to handle.

The entire device is usually made but little larger than a foot in height, and ten or eleven inches in diameter at the base. It is preferably made of sheet metal, and, being light, it can easily be moved from place to place.

Having thus fully described my invention, what I claim as new, and desire to secure by Letters Patent, is—

The combination of the casing A, having notches b b and hinged doors C C, the inner polygonal tapering shell B, air-chamber B', inclines G, grate E, pipe C, extending through the side of the body, and removable cap F, all constructed substantially as and for the purposes set forth.

In testimony that I claim the foregoing I have hereunto set my hand this 17th day of February, 1875.

WM. COOPER.

Witnesses:
 J. M. MASON,
 J. TYLER POWELL.